Figure 1:
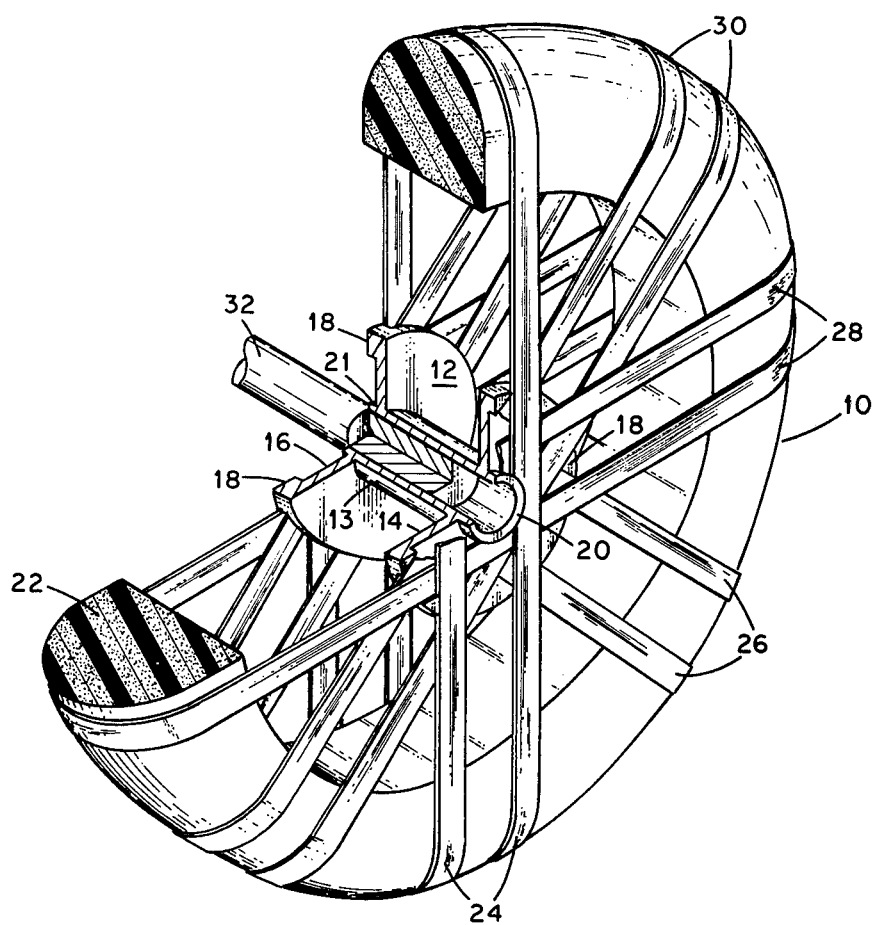

United States Patent [19]

Knight, Jr. et al.

[11] 4,123,949

[45] Nov. 7, 1978

[54] INERTIAL ENERGY STORAGE DEVICE

[75] Inventors: Charles E. Knight, Jr., Knoxville; James J. Kelly, Oak Ridge; Roy E. Pollard, Powell, all of Tenn.

[73] Assignee: The United States of America as represented by the United States Department of Energy, Washington, D.C.

[21] Appl. No.: 833,118

[22] Filed: Sep. 14, 1977

[51] Int. Cl.² .................. F16F 15/30; F16D 3/58; F16D 3/14
[52] U.S. Cl. .................................... 74/572; 64/12; 64/27 NM
[58] Field of Search ........... 74/572; 64/27 L, 27 NM, 64/12, 13; 310/262, 271, 74

[56] References Cited

U.S. PATENT DOCUMENTS

| | | | |
|---|---|---|---|
| 1,107,315 | 8/1914 | Krebs | 64/13 |
| 2,295,348 | 9/1942 | Leach | 64/27 L X |
| 3,724,288 | 4/1973 | Jakubowski | 74/572 |
| 3,964,341 | 6/1976 | Rabenhorst | 74/572 |
| 3,977,273 | 8/1976 | Ernst et al. | 74/572 |

FOREIGN PATENT DOCUMENTS 2,119,015 10/1972 Fed. Rep. of Germany ............. 74/572

Primary Examiner—Samuel Scott
Assistant Examiner—Don E. Ferrell
Attorney, Agent, or Firm—Dean E. Carlson; Stephen D. Hamel; Earl L. Larcher

[57] ABSTRACT

The inertial energy storage device of the present invention comprises a composite ring formed of circumferentially wound resin-impregnated filament material, a flanged hollow metal hub concentrically disposed in the ring, and a plurality of discrete filament bandsets coupling the hub to the ring. Each bandset is formed of a pair of parallel bands affixed to the hub in a spaced apart relationship with the axis of rotation of the hub being disposed between the bands and with each band being in the configuration of a hoop extending about the ring along a chordal plane thereof. The bandsets are disposed in an angular relationship with one another so as to encircle the ring at spaced-apart circumferential locations while being disposed in an overlapping relationship on the flanges of the hub. The energy storage device of the present invention has the capability of substantial energy storage due to the relationship of the filament bands to the ring and the flanged hub.

6 Claims, 2 Drawing Figures

INERTIAL ENERGY STORAGE DEVICE

The present invention relates generally to inertial energy storage devices, and more particularly to a fiber composite flywheel utilizing filamentary material in a resin matrix. The invention described herein was made in the course of, or under, a contract with the U.S. Energy Research and Development Administration.

The utilization of flywheels as inertial energy storage mechanisms for providing useful and storable energy for power generating purposes has been seriously investigated with a considerable effort being directed to a flywheel system which may be efficiently utilized in automobiles as an energy source so as to significantly reduce the petroleum requirements of the world.

Flywheels have for some time been utilized for storing inertial energy and for reducing vibrations and pulsations in power producing heat engines, electrical motors, and generators. Generally, however, the flywheels used in these applications rotate at relatively low speeds and were fabricated from relatively heavy materials such as iron or steel. These flywheels provide energy storage at low rotational speeds by utilizing relatively large masses and diameters. However, the mass of these heavy metal flywheels as well as the necessary volume required of the large diameter flywheels would be prohibitive for use in many energy storage applications such as in automobiles and other systems where spaced and weight requirements are substantially limited.

Recent developments in the flywheel technology relate to the use of lightweight composite materials in place of the previously used metal for the fabrication of flywheels with the basic configurations of the flywheels being in the forms of rings, rods, and disc. Research on flywheels constructed of fiber composite materials has demonstrated that significant energy storage may be achieved since the greater rotational speeds attainable by the fiber composite flywheels as compared with metal flywheels yields a mechanism wherein a flywheel of substantially smaller mass may be utilized to store energy at least equivalent to that of a substantially larger and heavier metal flywheel system since the inertial energy storage varies as a square of the speed of rotation. Thus, a relatively light flywheel which may be rotated at an angular velocity substantially greater than a heavy metal flywheel may be readily substituted for the heavier metal flywheel for storing the same amount of energy. However, there are several shortcomings or drawbacks found to be attendant with the construction of flywheels from composite materials so as to be capable of maintaining structural integrity at the angular velocities necessary to provide the desired level of energy storage. For example, the centrifugal forces encountered at such high velocities causes radial growth of the flywheel which, in turn, causes composite delamination and fiber failure.

Accordingly, the present invention has as its primary aim or goal the fabrication of an improved inertial energy storage device or flywheel which is capable due to its construction of maintaining structural integrity at relatively high angular velocities so as to provide greater energy storage per unit weight than previously known fiber composite flywheels. The flywheel of the present invention comprises a spool-shaped metal hub having lugged flanges on opposite ends of an open end cylinder or sleeve, a ring concentrically disposed about and spaced from the hub and formed of circumferentially wound continuous filamenting material in a resin matrix, and a plurality of fiber composite bandsets spaced apart from one another about the circumference of the ring and disposed in an overlapping relationship on the flanges of the hub between the lug projections for coupling the ring to the hub and for torque transference between the hub and ring during acceleration and deceleration of the flywheel. The composite bandsets due to their construction and position on the ring follow the radial growth of the ring during high rotational speeds and yet are of sufficient rigidity and stiffness so as to provide a structurally sound and rigid coupling between the ring and the hub at high speeds. The lugs on the hub flanges function to strengthen the coupling between the bands and the hub so as to facilitate torque transference between the ring and the hub via the bandsets.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 2:
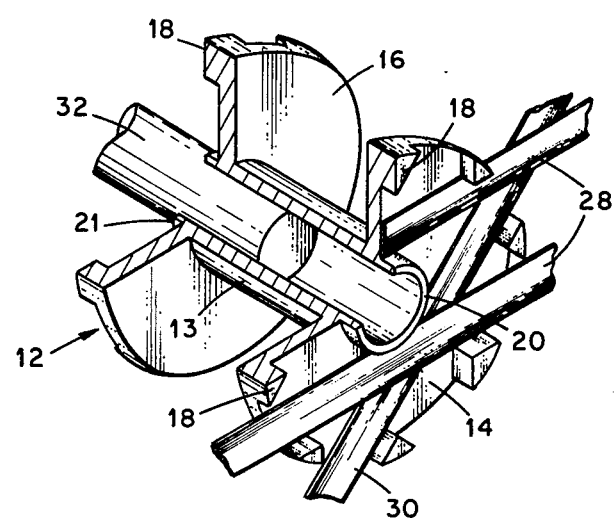

In the accompanying drawings:

FIG. 1 is a perspective view partly broken away of the inertial energy storage device of the present invention; and FIG. 2 is a perspective view broken away showing details of the hub and bandset construction of the energy storage device shown in FIG. 1.

With reference to the accompanying drawings, the rotary inertial energy storage device generally shown at 10 comprises a hub 12 defined by an elongated hollow sleeve or cylinder 13 having disc-shaped flanges 14 and 16 adjacent opposite ends thereof with circumferentially spaced apart peripherally disposed lugs 18 projecting from the surface thereof. The cylinder 13 projects through the flanges 14 and 16 to define centrally disposed bosses 20 and 21. A composite rim or ring 22 which is formed of circumferentially wound resin-impregnated filamentary material is concentrically disposed about the hub 12 in a spaced relationship therewith. A plurality of bandsets 24, 26, 28 and 30 are bonded to the ring 22 at circumferentially spaced-apart locations and to the hub flanges 14 and 16 in the overlapping relationship thereon with the lugs 18 and the bosses 20 and 21 protruding between and separating the bands and bandsets. Each of the bandsets comprises a pair of parallel bands disposed on opposite sides of the centrally disposed bosses 20 and 21. Each band of each bandset is in the form of a generally rectangular hoop provided by winding resin-impregnated single-ended filamentary material about the ring 22 along a chordal plane lying contiguous to the centrally disposed bosses 20 and 21. The lugs 18 and the bosses 20 and 21 on the flanges 14 and 16 provide for the alignment and formation of the bands. Each of the bands are wound with a uniform stress during the formation thereof so that the bands will undergo uniform stresses over the entire width thereof throughout the acceleration and deceleration modes of the flywheel to assure that the maximum strength of each band is realized during flywheel operation so as to minimize the deleterious effects of interfacial radial stresses between the rim and the band and thereby maximizing the integrity of the flywheel at relatively high rotational velocities.

Described in greater detail, the hub 12 comprises an integral open ended cylindrical body 13 with integral discoidal flanges 14 and 16 disposed adjacent opposite ends thereof. The distance between the outer surfaces of the flanges 14 and 16 is essentially similar to the width of the rim 22 so as to assure that the innerconnecting filament composite bandsets will not be subjected to a bending plane at the hub during rotation. The bosses 20 and 21 project beyond the outermost surface of the flanges a distance at least as great and preferably slightly greater than the combined thickness of the four bandsets 24, 26, 28 and 30, as will be described in greater detail below. The hub 12 is preferably formed of a metal such as a high-strength aluminum alloy, e.g. 6061-T6, or another suitable high strength-to-weight ratio metal such as titanium because of its own internal inertial stresses.

The circumferentially spaced-apart lugs 18 on the surface of the hub flanges 14 and 16 are disposed near the peripheral edge of the flanges and are of a generally triangular configuration. The lugs 18 are so arranged on the flanges that the sides of these triangular-configured lugs project along chordal planes of the flanges 14 and 16 a distance from the outermost surface of the bosses 20 and 21 corresponding to the width of a single filament wound band. As shown, the sides of the spaced-apart lugs along each of these chordal planes are in alignment so as to provide two lug surfaces in contact with each band. The height of the lugs 18 corresponds to the height of the bosses 20 and 21 so as to assure that the bands will be disposed in a contacting relationship with the lugs and bosses during the rotation of the flywheel. As pointed out above, the lugs 18 help maintain the bandsets in position during rotation and aid in the torque transfer between the hub 12 and the ring 22.

When the flywheel is rotating, the radial stresses in the end plates or flanges 14 and 16 of the hub 12 tend to expand the ends of the bore through the connecting cylinder 13, which in turn applies a bending moment to the ends of this cylinder 13 so as to cause it to "close" upon a power transference shaft such as shown at 32. This "bending" of the cylinder 13 provides a "self-lock" feature on the shaft 32 as the speed of the flywheel is increased so as to prevent the formation of a free space between the cylinder 13 and the shaft 32 which would result in a deleterious self-destruction of the flywheel. The shaft 32 may be light press fitted or otherwise secured within the hub 12.

The ring 22 is a circumferentially wound resin-impregnated composite formed of a single ended filament winding. The filament material is preferably a high strength polymer fiber of the aromatic polyamide family manufactured by E. I. Dupont deNemours and Company, Inc., under the trademark "Kevlar-49". Alternatively, glass fibers, such as E-glass or S-glass may be used to fabricate the flywheel but do not provide the high strength-to-weight of the polyamide fibers. Normally, the polyamide fibers have a strength-to-weight factor of about 7 times that of high strength steel so as to make them highly satisfactory for the fabrication of the flywheel. The E-glass has a strength-to-weight factor of about 4 over that of high strength steel.

The resin utilized for the impregnant in the composite ring 22 is preferably an epoxy resin system curable at room temperature, over a duration of about 3 days. Room temperature curing resin systems are believed to be more practical for the formation of flywheels of fibers since such orthotropic fibers as Kevlar-49 experience less problems due to micro-cracking, delamination, and residual stresses than with relatively high-temperature curing epoxy resin systems.

In the formation of the ring 22 the single ended filamentary material is wound with the epoxy impregnant in a side-by-side manner in layers to build up the ring to its desired thickness. The filamentary material may be in the form of a strand, or roving, ranging from about 380 to about 4560 denier in the case of Kevlar-49 and is wound under a winding tension ranging from about 500 grams to 4500 grams with this winding tension being proportional to the particular thickness of the filamentary material. Sufficient filamentary material is used in winding the ring to provide a fiber content in the latter of at least about 70 volume percent.

The thickness of the ring 22 selected for the flywheel of the present invention is subject to radial and hoop-stress distributions in a rotating orthotropic ring with the inner-to-outer radius ratio, material density, material elastic properties and desired angular velocity controlling these distributions. With the epoxy-polyamide fiber composite the minimum inner-to-outer diameter radius ratio based on the reported properties of these materials for the ring is 0.75. This minimum radius ratio is the same for the glass-fiber epoxy system. Smaller radius ratios produce radial stresses that would delaminate the ring premature to ultimate hoop strength unless the radial stresses are modified by alternate design schemes. Larger radius ratios do not utilize the full energy storage capacity of the material in this flywheel design. It appears that the strength suggested for these materials may be optimisitc, in which case the minimum radius ratio would be larger. In each case the radius ratio should be selected to minimize delaminations and problems associated with radial growth at the high rotational speeds required to store the maximum inertial energy.

The outer surface contour of the ring is shaped to reduce dependence on a ring-to-band bond. As the flywheel is rotating, any portion of a connecting band that is unsupported will tend to displace such that it will seek its minimum potential energy configuration which if represented as a relatively flexible, extensible looped cord, freely spinning about the axis of rotation without a rim would be in the configuration similar to the catenary in a constant gravitational field. Therefore, in order to provide the band with minimal stresses and to assure the integrity of the bond between the band and the ring it is preferable to provide the ring with a rotational catenary shape at the outermost surface thereof. The rotational catenary shape may be derived from variational principles in mechanics and the shape results from minimizing the potential energy of a flexible, inextensible cord attached at two points in the geometrical space subject to the cord length constraint. In the present invention the ring has round corners machined to a relatively small radius and the shape is derived to lie tangent to these radii and the arc length adjusted to keep the ring in a near rectangular cross section to maximize the moment of inertia and thus the stored energy. With the ring so shaped the rotational catenary portion of the band will maintain its shape as the flywheel spins so as to apply minimal tensile stress to the innerface bond between the band the the ring. The fact that the ring expands at a greater rate than the band will induce compression at the innerface along the radiused corners and likewise at the catenary-shaped interface.

The four bandsets 24, 26, 28 and 30 are utilized to join the ring and the hub so as to provide torque transference therebetween as well as to ensure the integrity of the ring during high rotational velocities. Each bandset is formed of a pair of discrete bands disposed parallel to each other on opposite sides of the rotational axis of the flywheel with the separation or spacing between the edges of these adjacently disposed bands corresponding to the outer diameter of the bosses 20 and 21. Each band of each bandset is in the configuration of a closed hoop which projects across a chord of the ring 22 about the outer surface thereof so as to encircle the ring about a chordal plane thereof while contacting or overlying oppositely disposed flanges 14 and 16 of the hub 12. The band is of a generally rectangular cross-section and is disposed between the bosses 20 and 21 and the lugs 18 with each band in a contacting relationship with the bosses 20 and 21 and two lugs 18 on each flange with these lugs contacting a common edge of the band.

The bands are preferably formed of the filamentary material and resin system similar to that employed in the fabrication of the ring as described above. The bands are of a rectangular configuration formed by winding a single ended resin-impregnated filament of the desired denier in a side-by-side relationship over the width thereof so as to provide a uniform stress loading on the band over the different arc or cord length of the ring covered by the band width. The uniform stressing of the band during application enables the band to be uniformly stressed during the growth of the ring as it accelerates to its desired rotational speed. The bandsets are axially spaced apart about the ring periphery with this spacing being at a maximum axial distance from one another so as to obtain the highest axial trunion spring rates with the frequency of these vibration modes being maximized. If the vibration frequencies are high enough to be outside the operating speed range for the flywheel then the flywheel operation is much smoother and eliminates the potential of a vibration instability failure due to these modes. Even if the frequencies are still in the operating range the higher frequencies have lower displacement amplitudes and thus reduce the potential for vibration instability failure. Also, the bands are disposed in an overlapping relationship on the flange surface so as to provide maximum bond shear strength used to prevent the ring from shifting positions due to one or more bands sliding relative to the remainder of the band set.

After applying the bands the resin-impregnant in the filamentary material forming the bands is room temperature cured as described above so as to securely bond the bands to the rings and the hub.

In order to provide a more facile understanding of the present invention an example relating to a typical fabrication of a flywheel is set forth below.

EXAMPLE

A flywheel having a configuration as shown in FIG. 1 was fabricated with the ring and bands being wound of high-strength Kelvar-PRD-49 fibers with an epoxy resin impregnant. The hub was machined from 6061-T6 aluminum.

In fabricating the ring, the filament was passed through a bath containing the resin and wound on a mandrel to a thickness of 2.5 inches. The ring was 3.400 inches in width and weighed 21.3 pounds. The inner-to-outer radius ratio of the rim was 0.75 with an inside diameter of 15.0 inches and an outside diameter of 20.0 inches.

In machining the hub, the flanges were reduced to a thickness of 0.300 inch with lugs protruding from the surface of the flange a distance of 0.300 inch. The total weight of the hub was 1.8 pounds.

The ring and hub were accurately located in an assembly fixture for winding the bands. A set of eight bands in 4 bandsets were wound across the hub and around the ring ends and were each 0.100 in. thick and 0.75 in. wide. The total weight of the bandsets was 1.5 pounds. The flywheel was cured at room temperature for 72 hours before the band winding fixture was removed. The total weight of the flywheel was 24.6 pounds.

After completing the fabrication, the flywheel was dynamically balanced and spin tested. The flywheel was spun to a rotational speed of 18,000 revolutions per minute. At this speed, small delamination-type fractures occurred but they were too small to cause failure. The flywheel was stably operated at this speed, then braked to a stop without further damage. The stored energy in the flywheel was 250 watt-hour at 18,000 rpm which is equal to an energy density of 10.1 watt-hour per pound based on the total weight of the flywheel. This is believed to be the highest energy density ever reported for a fiber composite flywheel.

It will be seen that the present invention provides a rotary inertial storage device capable of providing greater stored energy per unit weight than previously known rotational energy storage devices. It will be appreciated that the flywheel as used herein is particularly adaptable to supplying energy with a relatively small mass so as to be utilized in the automobile industry as a means of supplying rotational energy to the drive wheels.

What is claimed is:

1. An inertial energy storage device rotatable about an axis comprising a fiber-resin composite ring, a metal hub concentrically disposed within said ring, and a plurality of fiber-resin composite bandsets of uniform width coupling said ring to said hub for co-rotation therewith, with each bandset comprising a pair of parallel bands each in the configuration of a closed hoop extending about the outer surface of the ring and projecting across a chordal plane of the ring and the hub contiguous to the axis of rotation with the bands of each bandset being disposed on opposite sides of the axis of rotation, each band of each bandset consisting of single-ended filamentary material wound in a side-by-side relationship and encased in a resin matrix, each of said bands being uniformly stressed over the width thereof during rotation of the device about said axis, each of said bands being disposed at circumferentially spaced-apart locations from one another about the periphery of the ring and with the bandsets disposed in an overlapping relationship with one another on portions of said hub at locations adjacent to and encompassing the axis of rotation.

2. An inertial energy storage device as claimed in claim 1, wherein said ring is formed of single-ended filamentary material wound in a side-by-side relationship in a plurality of layers and encased in a resin matrix, said ring has a minimum inner-to-outer radius ratio of 0.75.

3. An inertial energy storage device as claimed in claim 2, wherein said ring has the outermost peripheral surface thereof in the configuration of a rotational catenary.

4. An inertial energy storage device as claimed in claim 1, wherein four bandsets provide said plurality of bandsets.

5. An inertial energy storage device as claimed in claim 1, wherein said hub comprises a pair of discoidal flanges defining said portions of the hub and coupled at the mid-points thereof by an open-ended cylinder, end portions of said cylinder project through said flanges a distance at least as great as the thickness of the plurality of the bandsets disposed on said portions of the hub, wherein a plurality of circumferentially spaced apart lugs are disposed on said flanges adjacent the outermost periphery thereof, said lugs extend from said flanges a distance corresponding to that of said end portions of said cylinder and are of a generally triangular configuration with sides of said lugs projecting along chordal planes of the flanges each spaced from the radially outermost surface of the end portions of the cylinder a distance corresponding to the width of one of said bands, and wherein each band is in a contacting relationship with the sides of two lugs one at each end of the chordal plane across said flange.

6. An inertial energy storage device as claimed in claim 5, wherein the bandsets are circumferentially disposed apart from each other about periphery of the ring distances sufficient to provide highest axial trunion spring rates with maximization of the frequency of the resulting vibration modes.

* * * * *